Nov. 13, 1923.
F. BRANDT
1,473,835
HOOK FASTENING FOR DERRICK BRACES
Original Filed Oct. 18, 1920
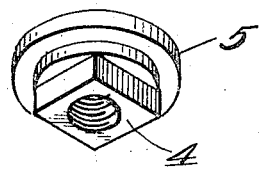
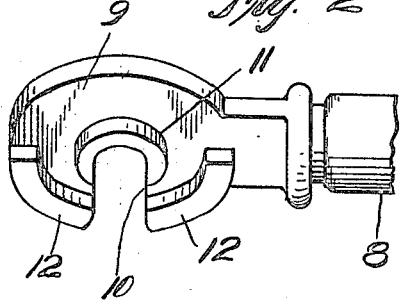
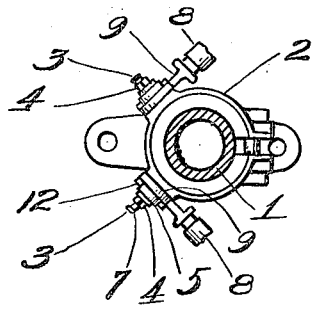
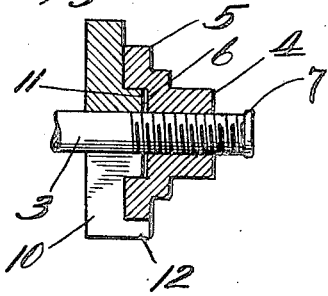
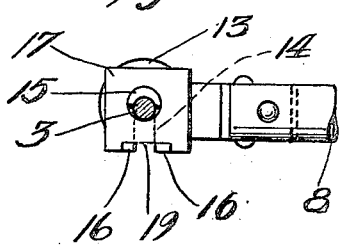
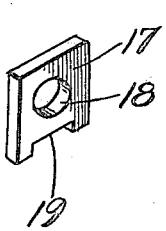
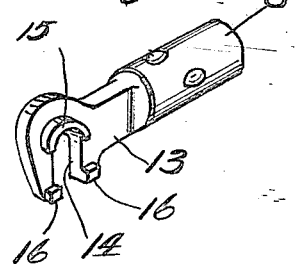

Patented Nov. 13, 1923.

1,473,835

UNITED STATES PATENT OFFICE.

FOKKO BRANDT, OF KANSAS CITY, MISSOURI, ASSIGNOR TO THE BRANDT & KRELL ENGINEERING COMPANY, OF KANSAS CITY, KANSAS, A CORPORATION OF KANSAS.

HOOK FASTENING FOR DERRICK BRACES.

Original application filed October 18, 1920, Serial No. 417,812. Divided and this application filed June 19, 1922. Serial No. 569,511.

*To all whom it may concern:*

Be it known that I, FOKKO BRANDT, a citizen of the United States, and resident of Kansas City, county of Jackson, State of Missouri, have invented a certain new and useful Improvement in Hook Fastenings for Derrick Braces, of which the following is a complete specification.

This invention relates to locking clamp hooks for use in securing the ends of braces, girts and the like to upright or corner posts in metal derrick and scaffolding structures, and forms a divisional application of my copending application for patent for oil well derrick, filed October 18, 1920, Serial Number 417,812.

One of the objects of the invention is to produce a locking bolt and nut of such character that the brace or the like, may be slipped into position on the bolt and locked in such position to corner post of the derrick or other structure without entirely disengaging the nut from position on the bolt.

Another object is to produce a device of this character in which there are no loose or stray parts which are small and liable to be lost or mislaid.

A still further object is to produce a device of the character set forth which is strong, simple, durable, efficient and inexpensive in construction, and in order that it may be fully understood, reference is to be had to the accompanying drawing, in which:—

Figure 1 is a perspective view of a combined nut and washer forming a part of the invention;

Figure 2 is a perspective view of the hook end of the girt, brace or the like;

Figure 3 is a section taken through a corner post of a derrick or scaffolding and illustrates the hook ends of a pair of braces in operative relation thereto;

Figure 4 is an enlarged central vertical section taken through the locking members;

Figure 5 is a view of a modified form of the invention in which the nut and washer members are separable;

Figure 6 is a perspective view of the washer of the modified form; and

Figure 7 is a perspective view of the modified form of hook end.

In the said drawing, where like reference characters identify corresponding parts in all of the figures, 1 represents one of the corner posts of a derrick or other structure and 2 a clamping band or coupling between a pair of the uprights forming such corner post (not detailed, as forming no part of this application), and said member 2 is provided with a pair of stud bolts 3 threaded at their outer ends (see Figure 4). The stud bolts 3 are permanently secured in position to the member 2 in any suitable manner and are adapted to cooperate in the bracing of the derrick or other structure, as will hereinafter appear.

Threaded for engagement on the threaded end of the stud bolt is a nut 4 formed integrally with a circular enlargement 5 forming a washer, the interior of the washer being cored out to form a chamber or recess 6 for a purpose hereinafter explained. In practice, it has been found desirable to upset or enlarge the end of the stud bolt as at 7 in order to prevent accidental dislodgement of the combined washer and nut, as will be readily understood.

Rigidly attached in any suitable manner to the end of each brace 8 is a flattened head 9, said head, in the preferred construction, being of substantially circular shape, and is provided with a slot 10 intersecting its axis and adapted to receive the stud bolt 3 of the corner post.

In order to prevent upward movement of the brace when it has been secured in position, a semi-circular rib 11 is formed on the outer face of the head 9, and is adapted to be received within the recess 6 of the combined nut and washer 4. It will be evident that with the construction above-described, the interlocked engagement of the rib 11 in the recess 6 of washer 5 will counteract and prevent the end of the brace from moving upwardly after the nut has been screwed downwardly into clamping engagement, as will be readily understood.

In practice, however, it has proven preferable to provide further abutment on the head, as under some conditions and character of work, it is impossible to make the rib 11 sufficiently strong to support the strain without being bulky, and in order to overcome this and still leave the combined nut and washer free for rotation on the stud bolt, a pair of semi-circular ribs 12 are formed on the face of the head, and said ribs are so arranged as to permit the combined washer and nut to be screwed inwardly, the rib 11 entering the recess 6 of the washer, and the ribs 12 receiving the outer circumference of the washer (see Figure 4). It will be evident that these ribs 12 will cooperate with the rib 11 in preventing upward movement of the brace end, and that both of them will also insure that the hook end has been completely forced down on the bolt as will be readily understood.

In some instances it may prove desirable to form the nut and washer independent of each other, and one form of such a device is illustrated by Figures 5 to 7, inclusive, in which: 13 indicates a flattened head of substantially U-shape, formed with a slot 14 for the reception of the stud bolt 3. A rib 15 is formed on the face of the head, and at the extremities of the two legs of the U-shaped head, a pair of ribs 16 are formed (see Figure 7).

The washer in this type of construction is preferably in the shape of a substantially square member 17 formed with a central bore or opening 18 of sufficient diameter to fit over and rest on the rib 15 when in operative position, and at its lower edge, the member 17 is cut away as at 19, and said cut away portion is adapted to receive the ribs 16 (see Figure 5) and co-operate with the rib 15 in preventing upward movement of the end of the brace. The nut (not shown) is of common and well-known construction and is adapted to be screwed into clamping relation with the washer and the parts will thus be held in rigid relation to each other.

It is also desirable to point out that the type of washer shown by Figures 5 to 7 inclusive, will, even after a fracture or breaking through the notched end of the head, maintain the end of the brace from pulling away from the stud bolt.

It will be apparent from the above description that in order to remove a brace from position in either of the types, it is only necessary to unscrew the nut a distance equal to the width of the ribs on the head, and that then the brace may be lifted vertically to disengage the slotted heads from the bolts, as will be readily understood.

From the above description it will be apparent that I have produced a device of the character described, which possesses all of the features of advantage set forth as desirable, and while I have described and claimed the preferred embodiment of the same, I reserve the right to make all changes properly falling within the spirit and scope of the appended claims.

What I claim is:

1. The combination of a part having a projecting bolt, a second member provided with a notched head engaging said bolt, a nut secured on the bolt and a washer fitting on the bolt and interposed between the said head and nut; said head having a rib engaging the washer to prevent edgewise withdrawal of said notched head from said bolt.

2. The combination of a part having a projecting bolt, a second member provided with a notched head engaging said bolt, a nut secured on the bolt and a washer fitting on the bolt and interposed between the said head and nut; said washer being provided with an opening, and a rib on said head in engagement with said opening of the washer.

3. The combination of a part having a projecting bolt, a second member provided with a notched head engaging said bolt, a nut secured on the bolt and a washer fitting on the bolt and interposed between the said head and nut; said head having a rib for engagement with a marginal portion of said washer.

4. The combination of a part having a projecting bolt, a second member provided with a notched head engaging said bolt, a nut secured on the bolt and a washer fitting on the bolt and interposed between the said head and nut; said washer being provided with an opening, a rib on said head for engagement with the opening in said washer, and a second rib on said head for engagement with a marginal portion of said washer.

5. The combination of a part having a projecting bolt, a second member provided with a notched head engaging said bolt, a nut in threaded engagement with said bolt and formed at one of its ends with an enlargement forming a washer, said washer being formed with an internal recess, and a rib on said head for engagement in said recess.

6. The combination of a part having a projecting bolt, a second member provided with a notched head engaging said bolt, a nut in threaded engagement with said bolt and formed at one of its ends with an enlargement forming a circular washer, and a rib on said head for circumferential engagement with the washer.

7. The combination of a part having a projecting bolt, a second member provided with a notched head engaging said bolt, a rib on said head, a washer on said bolt and provided with an opening for the reception of the rib on said head, and a nut abutting said washer and clamping the members together.

8. The combination of a part having a projecting bolt, a second member provided with a notched head engaging said bolt, a nut secured on the bolt and a washer fitting on the bolt and interposed between said head and nut; said head and washer having interlocking engagement to prevent edgewise withdrawal of said head from said bolt.

In witness whereof I hereunto affix my signature.

FOKKO BRANDT.